United States Patent [19]
Kavera et al.

[11] 3,741,223
[45] June 26, 1973

[54] DEVICE FOR LIQUID TREATMENT OF GRANULATED PRODUCTS

[76] Inventors: Alexandr Alexandrovich Kavera, ulitsa Bryanskaya, 2a, kv. 35; Anatoly Anatolievich Nitkovskikh, pereulok Krupskoi, II, both of Krasnodar; Vladimir Andreevich Grigoriev, ulitsa Gerow-panfilovtsev, 13, kv. 40, Moscow; Arkady Borisovich Pashkov, Khoroshevskoe shosse, 74, korpus 3, kv. 56, Moscow; Yakov Vulfovich Epshtein, ulitsa Pervomaiskaya 85, kv. 10, Moscow, all of U.S.S.R.

[22] Filed: Feb. 12, 1971

[21] Appl. No.: 114,866

[52] U.S. Cl. ................ 134/191, 99/534, 134/25 R, 134/79, 134/183, 259/8, 264/343
[51] Int. Cl. ........................... B01f 7/16, B08b 3/08
[58] Field of Search ................ 134/25 R, 181, 191, 134/198; 99/237 R; 117/100 A; 118/24, 303; 259/8

[56] References Cited
UNITED STATES PATENTS

| | | | |
|---|---|---|---|
| 2,592,709 | 4/1952 | Kinnaird | 259/8 |
| 3,415,494 | 12/1968 | Fisher et al. | 259/8 |
| 2,254,867 | 9/1941 | Bonotto | 99/237 R UX |
| 3,158,358 | 11/1964 | Fischer | 259/8 X |
| 1,169,599 | 1/1916 | Barker | 99/237 R |
| 3,156,534 | 10/1964 | Josephson et al. | 259/8 X |

FOREIGN PATENTS OR APPLICATIONS

| | | | |
|---|---|---|---|
| 444,833 | 3/1936 | Great Britain | 118/303 |
| 189,830 | 10/1907 | Germany | 259/8 |

Primary Examiner—Daniel Blum
Attorney—Holman & Stern

[57] ABSTRACT

A device for liquid treatment of granulated products comprises a cylindrical housing accommodating a co-axially mounted shaft with stirrers, which shaft carries at least one cup, above which there is fixedly secured a guide with a central aperture, while the shaft is hollow within at least the section of one cup and is provided with radial holes for supplying the liquid.

7 Claims, 2 Drawing Figures

DEVICE FOR LIQUID TREATMENT OF GRANULATED PRODUCTS

The present invention relates to devices for liquid treatment of granulated products, e.g. for effecting the process of swelling of granules of vinylbenzene and divinylbenzene copolymer in dichloroethane in the process of production of sulphocathionite when the proportion of components must be strictly definite and the liquid component must be uniformly distributed on the granules.

Widely known in the art is a device for liquid treatment of granulated products comprising a cylindrical housing arranged coaxially to a rotary shaft with stirrers.

The granules and liquid components are loaded into the device in prescribed proportions and are stirred during a predetermined period of time.

However, this device does not provide for effective and uniform wetting of the granulated product with a liquid.

On conducting in this device the process of swelling of granules of vinylbenzene and divinylbenzene copolymer in dichloroethane, a product having uniform degree of swelling is not provided and this fact adversely affects the quality of the target product, i.e., sulphocathionite.

The difference in the degree of swelling of separate granules of the product arises from the properties of these granules and is caused by the non-uniform distribution of the liquid component therebetween.

A major portion of the liquid fed into the device wets the upper layers of the granules while the lower layers thereof are wetted to a lesser degree.

In the process of stirring the amount of liquid on the granules is somewhat redistributed nevertheless, the degree of swelling of the granules remains non-uniform and the obtained product features a low quality.

An object of the present invention is to eliminate the above mentioned disadvantages.

The main object of the invention is to provide a device for liquid treatment of granulated products which will ensure effective and uniform wetting of the granulated product by a liquid due to a forced movement of the granules within a thin layer of a liquid under the action of centrifugal forces.

This object is accomplished by providing a device for liquid treatment of granulated products comprising a cylindrical housing accommodating coaxially arranged shafts with stirrers; according to the invention, mounted on the shaft is at least one cup, above which there is fixedly secured a guide with a central hole, while the shaft is hollow at least at the section of one cup and has radial orifices for supplying the liquid.

The above-said cups are preferably made conical, while the said guides are preferably made as funnels with rounded peripheral edges.

The proposed device provides for efficient and uniform wetting of the granulated products and can be used in the chemical, food and pharmaceutical industries for wetting grain and other granulated products.

The invention will be apparent from a consideration of the following detailed description of one particular embodiment of the invention, reference being made to the accompanying drawings, in which.

Figure 1:
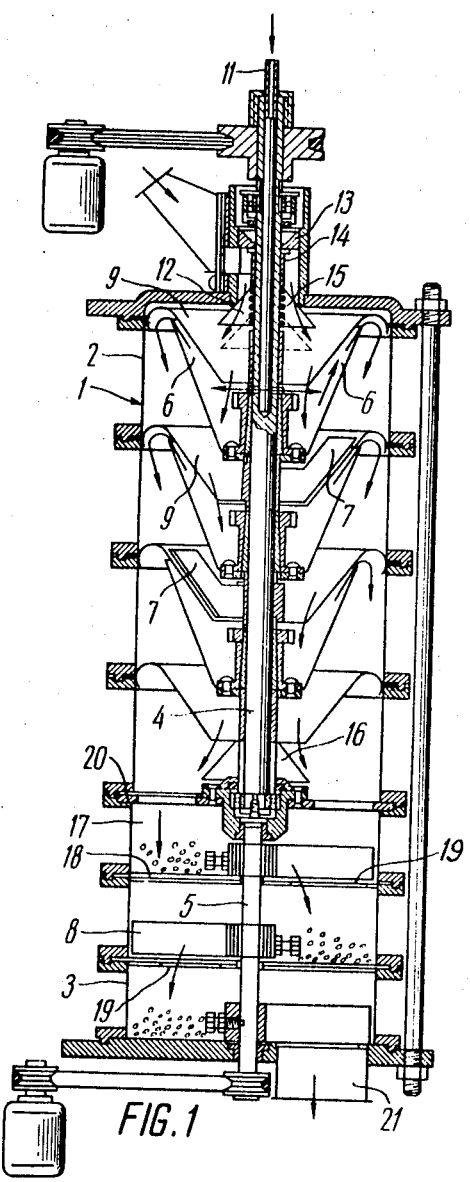
FIG. 1 shows a device for liquid treatment of granulated products according to the invention.

The device for liquid treatment of granulated products (FIG. 1) has a housing 1 assembled from four upper drums 2 and three lower drums 3.

A portion of the housing 1, in which there are located the upper drums 2, is used for watering and mixing the granulated product with a liquid component while the other portion of the housing 1 with the lower drums 3 mounted therein is used for ripening (final swelling) of the granulated product. Mounted along the longitudinal axis of the housing 1 are coaxial rotary shafts 4 and 5 having a common bearing. The shaft 4 carries stirrers 7.

Rigidly secured on the shaft 4 are conical cups 6 and on shaft 5 single-arm stirrers 8. Rigidly secured above each conical cup 6 is a guide 9 made in the form of a funnel with rounded peripheral edges and apertures in the center. The peripheral edge of the guide 9 has a shoulder which is clamped between the end faces of the drums 2.

Figure 2:
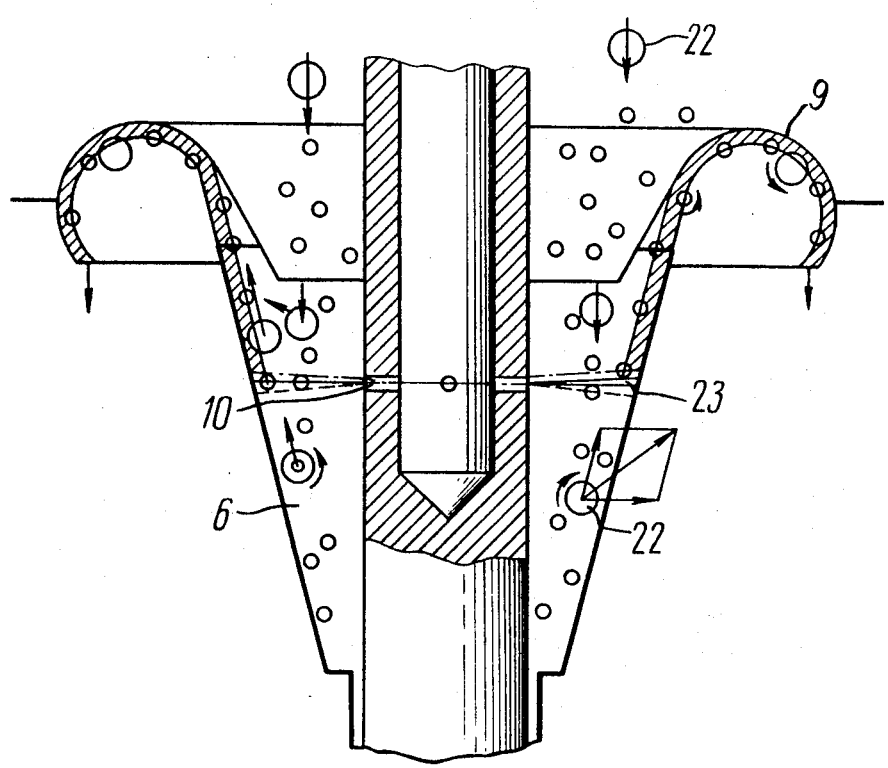
FIG. 2 shows a conical cup according to the invention.

The shaft 4 within the zone of the upper conical cup 6 is hollow and has a number of radial holes 10 (FIG. 2). The union 11 (FIG. 1) of the shaft 4 serves for supplying the liquid into the hollow portion of the shaft 4.

Provided in the upper portion of the housing 1 is a conical gate 12 actuated by a centrifugal governor consisting of a ring 13, a bushing 14 and a spring 15.

Located at the lower end of the shaft 4 is a cone 16. The drums 3 form sections 17 which are separated by stationary partitions 18. Each partition is provided with an opening 19 through which the granulated product is fed into the next section 17 by means of the single-arm stirrer 8, the opening 19 of each following section being displaced relative to the opening of the preceding section at a certain angle. The partition 20 dividing the housing 1 into two portions, in one of which there are disposed the drums 2 and in the other the drums 3, is provided with perforations evenly distributed along a circle.

For discharging the ready product from the device, a throat 21 is provided in the housing 1. A modification of the device is possible, without a lower portion which may belong to a separate apparatus and be of another construction.

The invention is carried into effect substantially in the upper portion of the proposed device. It is self-evident that the invention is not limited by a construction of the device comprising seven drums. Their number may be increased or decreased depending on the properties of the material being processed. Also, the guides may have another configuration.

The device for liquid treatment of the granulated products operates as follows:

when the shaft 4 (FIG. 1) starts to rotate, the conical gate 12 is lowered under the action of the centrifugal governor (its position is shown in FIG. 1 by the dotted lines). When lowered, the conical gate 12 opens the throat for charging a solid component, for example granules of vinylbenzene and divinylbenzene copolymer.

The granulated product is fed on the upper guide 9 and is poured along the conical surface thereof into the cup 6. At the same time, fed into the hollow portion of the shaft 4 through the union 11 is a liquid component, e.g. dichloroethane, which is sprayed through the radial holes 10 (FIG. 2) of the shaft 4 onto the granules of the copolymer within the upper conical cup 6. The solid and liquid components are supplied in a definite proportion, for example 1:0.5 and 1:0.25 respectively.

The granule 22 falls through the liquid spraying zone 23 and under the effect of the centrifugal force, appearing in the process of rotation of the conical cup 6, is firstly pressed to the inner wall of the cup and then, while rotating, moves upwards along this wall, rolling through a layer of the liquid shown in FIG. 2 as a shaded area on the surfaces of the cup 6 and the guide 9.

Thus, there is provided an intensive contact of each granule 22 with the liquid component. Thereafter, moving along the external surface of the guide 9, the granules together with the liquid are fed into the next conical cups 6 wherein there is effected further mixing for the purpose of redistribution of the liquid component on the granules 22 up to the swelling of the granules.

In the process of watering and mixing the granules partially (in the surface layer) swell. Their final swelling ocurs in the lower portion of the device in the sections 17 (FIG. 1). The granulated product is fed into the upper section through the lower guide 9 along the cone 16 through the perforations disposed along a circle in the stationary partition 20. By means of the stirrer 8 the product is loaded through the opening 19 in the partition 18 into the next section, etc. As the openings 19 in the partitions 18 are displaced relative one another, the product, while moving downwards, executes a complex motion.

During this motion the product ripens, i.e., swells finally.

From the last section 17 the product is discharged through the throat 21.

Therefore, the proposed invention makes it possible to provide for effective and uniform liquid treatment of granulated products. The proposed device is advantageous in that the liquid treatment of granulated products is effected as a continuous process.

We claim:

1. A device for liquid treatment of a granulated product comprising a cylindrical housing, a rotary shaft coaxial with the housing, an upstanding cup and a stirrer secured to said shaft so as to be rotatable therewith, a fixed guide adjacent the mouth of the cup, said guide having a central aperture through which granules are fed into the cup, the underside of the guide being contiguous with the inner face of the cup, and at least one hole in said shaft extending transversely thereof from a hollow part of the shaft to the interior of the cup, the arrangement being such that, when the shaft is rotated and jets of liquid are ejected from the hollow part of the shaft through said hole into the cup and granules are fed into the cup through said guide, the granules are first wetted by said jets, and, due to centrifugal force, liquid moves up the inner face of the cup and forms a film thereon and on the underside of said guide, and the granules are further wetted by moving through said film on their way out of the cup.

2. A device as claimed in claim 1, in which the cup is of frusto-conical shape and is coaxial with the shaft and the guide is in the form of a funnel coaxial with the shaft and having an external inverted trough extending peripherally at the mouth of the funnel.

3. A device as claimed in claim 1, in which there is at least one additional cup with the latter having a guide and stirrer, the additional cups being spaced one below another.

4. A device as claimed in claim 3, in which said cups are contained in an upper portion of the housing, the housing having a lower portion into which granules can pass from the upper portion and formed in sections one below another, the sections being separated by partitions having openings leading successively from one section to the next section and then to a discharge throat in the lowermost section, and each section containing a rotary paddle for sweeping granules through said openings and throat.

5. A device as claimed in claim 4, in which said openings are circumferrentially displaced relative to one another.

6. A device as claimed in claim 1, in which the inlet of granules into the cup is through a gate which is controlled by a centrifugal governor on the shaft.

7. A device as claimed in claim 3, in which an upper portion of the housing comprises a plurality of drums between opposed faces of which peripheral flanges on said guides are clamped.

* * * * *